UNITED STATES PATENT OFFICE.

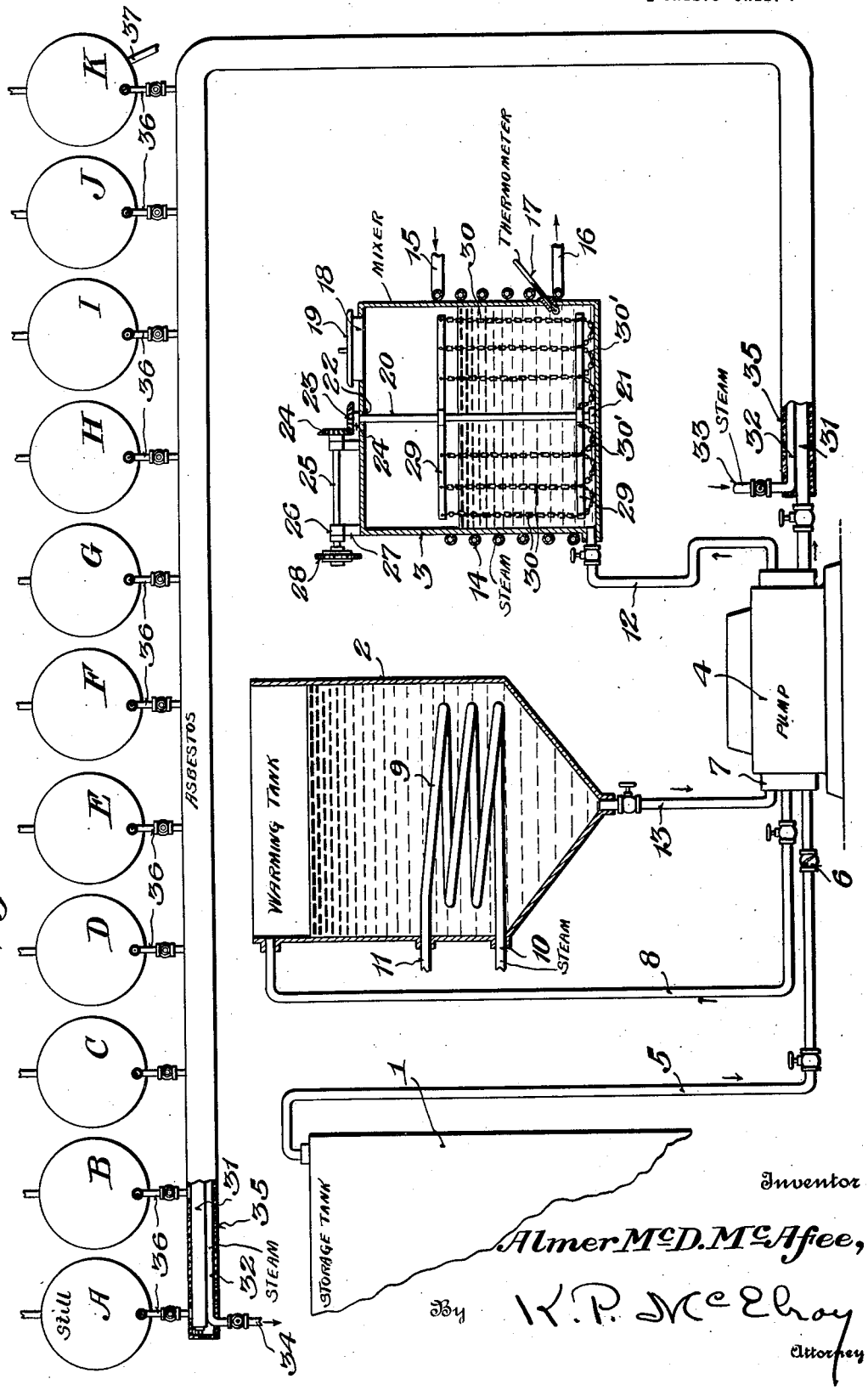

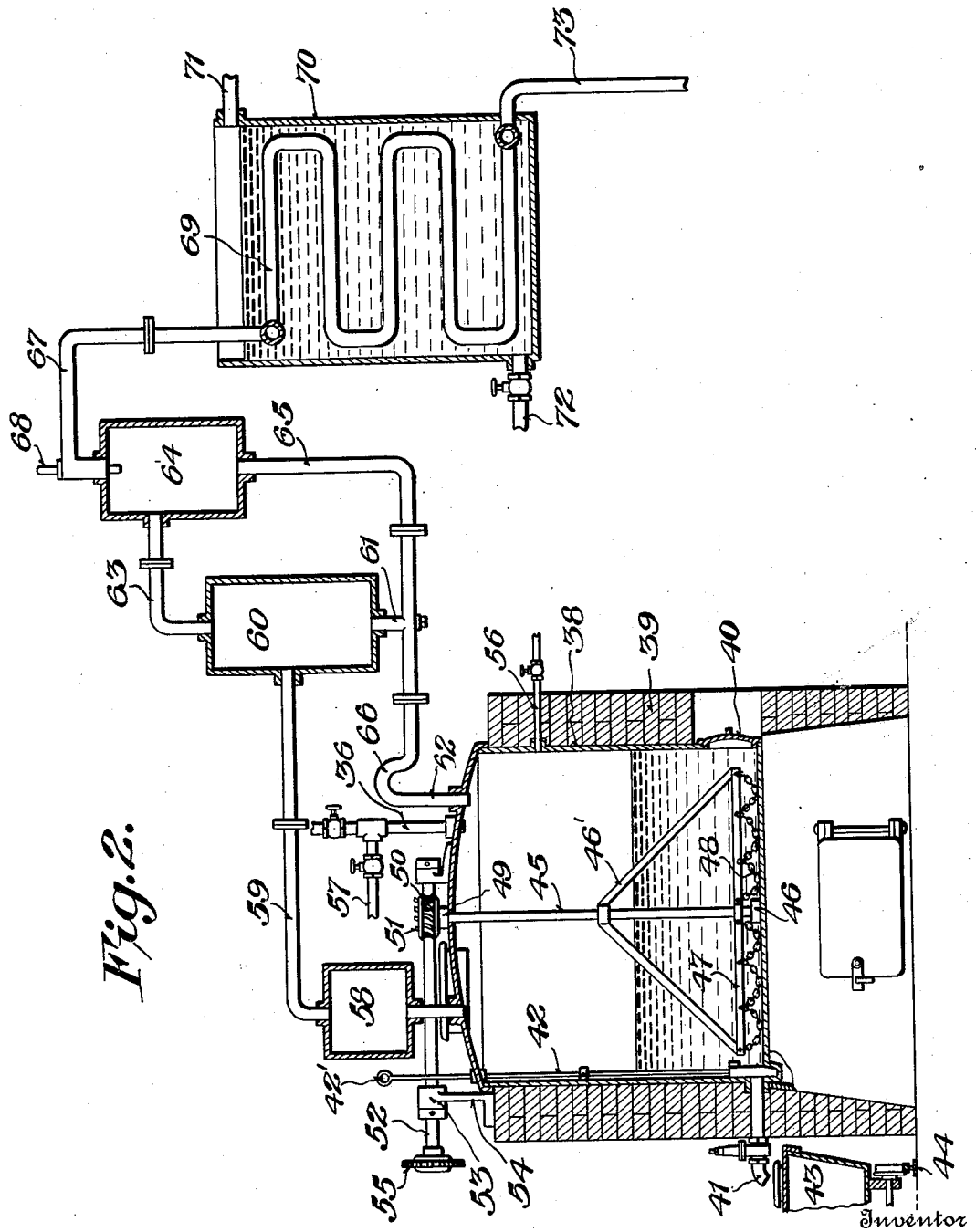

ALMER McD. McAFEE, OF PORT ARTHUR, TEXAS, ASSIGNOR TO GULF REFINING COMPANY, OF PITTSBURGH, PENNSYLVANIA, A CORPORATION OF TEXAS.

MANUFACTURE OF GASOLINE.

1,405,054.  Specification of Letters Patent.  Patented Jan. 31, 1922.

Application filed July 12, 1918. Serial No. 244,611.

*To all whom it may concern:*

Be it known that I, ALMER McD. McAFEE, a citizen of the United States, residing at Port Arthur, in the county of Jefferson and State of Texas, have invented certain new and useful Improvements in the Manufacture of Gasoline, of which the following is a specification.

This invention relates to the manufacture of gasoline; and it comprises certain improvements in the art of manufacturing gasoline from various petroleum oils and materials at a boiling or distilling temperature with the aid of dry aluminum chlorid whereby the operation is made simpler, more efficient and more continuous; the stills used for the production of gasoline being run continuously with fresh aluminum chlorid delivered to the stills from time to time as a magma containing merely sufficient oil to render it thin enough for convenient handling and pumping, and exhausted aluminum chlorid being removed from time to time from the stills without interruption of the operation thereof—a plurality of stills being run in parallel but out of phase, so that one still can be temporarily placed out of operation for the purpose of inspection while others are kept operating; and it also comprises as a new organization of apparatus elements, a plurality of stills, each provided with stirring means, an aluminum chlorid inlet, an oil inlet, an oil outlet, and a tar valve for discharging aluminum chlorid residues, and means for making a magma of aluminum chlorid and warm oil, and means for pumping such magma to any one of the plurality of stills; all as more fully hereinafter set forth and as claimed.

Gasoline is the commercial name for low boiling petroleum products suitable for use in internal combustion engines. Most gasoline was formerly made by simple distillation of crude petroleum; but much is now made by a cracking distillation; a distillation which breaks up the heavier oils of petroleum to give lighter oils such as merchantable gasoline. Gasoline made by cracking is not, so far as is known to this applicant, of as good a quality as that made by a simple distillation of crude oil; the so-called refinery gasoline. It is unsaturated in its nature and the odor is not liked. A much better grade of artificial gasoline can be made by the action of dry aluminum chlorid on various heavier petroleum oils, kerosene, solar oil, gas oil, lubricating oil, crude oil, etc. When a heavy oil, such as, for instance, gas oil, is mixed with a few per cent of dry aluminum chlorid and the mixture heated, it comes to a boil somewhat below the normal boiling temperature of the particular oil used; with a gas oil which begins to boil at 600° F., in admixture with 5 per cent or so of aluminum chlorid ebullition sufficient for distillation will occur somewhere between 500 and 550°. The vapors produced in ebullition of the mixture contain gasoline and also aluminum chlorid (or vapors of compounds of aluminum chlorid with constituents of the oil). As I have discovered and elsewhere claimed (see Serial No. 792,615), if the operation be so conducted that the mixture in the still is kept in vigorous ebullition and the vapors are cooled to 300–350° F., the aluminum chlorid (or its compounds) can be condensed and returned to the still while the gasoline vapors go forward and can be condensed in any suitable condenser. It is absolutely necessary to condense the aluminum chlorid vapors by some sort of cooling arrangement between the stills and the condenser, both to keep the aluminum chlorid from escaping from the zone of reaction and also to prevent aluminum chlorid reaching cold parts of the condenser and plugging it. If the vapors at the point of exit from these cooling means to the condensing means be held at a temperature of around 300° F., the product recovered from the condenser will be commercial gasoline and of a high grade; being saturated in its nature, of pleasant odor and not inferior in any way to natural or refinery gasoline. If the temperature be kept somewhat lower, say, 275° F., the product recovered will be an exceptionally high grade of gasoline suitable for aviation and similar purposes. By holding the temperature at the point of exit at about 350° F., the condensate will contain more or less kerosene or burning oil which can be separated from the gasoline also formed by redistillation in a well known manner.

While this operation, as just stated, is simple in its nature and can be operated with simple apparatus, in practice in order to get the best results a methodical operation with due regard for the peculiarities of the material is desirable. Such a methodical operation it is the purpose of the present invention to furnish.

Aluminum chlorid is a solid, rather volatile material which is instantly decomposed by contact with moisture to give a hydrated aluminum chlorid which, for the present purposes, has no catalytic activity whatsoever and on the other hand is quite undesirable in the stills. At the usual still temperatures, hydrated aluminum chlorid tends to give off HCl gas which may pass over into the gasoline, necessitating an after-treatment with alkali for its removal. In the operation it is therefore necessary that everything be kept as dry as possible; the oil being heated to drive off moisture prior to using it and the chlorid being shielded from the action of aerial moisture in transportation and handling as much as may be between the point of production and the point of use. As the aluminum chlorid comes from the condensing chambers in the usual methods of production, it is in the form of hard crystals or crystalline lumps, which are frequently rather large. As the action of aluminum chlorid on hot oil is rather energetic, the addition of solid lump aluminum chlorid to a boiling mass of oil in a still is inconvenient and may result in foaming or irregularity in distillation. Comminution of lump chlorid in order to enable the use of ordinary types of feeding apparatus is undesirable; partly because the hygroscopic nature of the material renders grinding difficult and partly because it is hard to prevent access of aerial moisture.

In the present invention I pump the aluminum chlorid into the still in the form of a fluid magma made by stirring up the solid material with warm oil; and I am thereby enabled to supply it at any rate and in any amount I wish without fear of foaming or disturbing the regular process of distillation. While aluminum chlorid is not very soluble in cold oils, it blends readily on simple stirring or agitation with oil at a temperature of about 150° F. making a thin fluid magma which can be readily pumped and handled. About one part of oil is required for one or two parts of aluminum chlorid to make a mixture which, at about 150° F., has the consistency of a thin coal tar. If there be any moisture in the material, HCl is developed in this mixing operation and may be allowed to escape; and it does not develop in the still. The best temperature in this mixing operation is around 150° F. At higher temperatures the aluminum chlorid may act on the oil with development of inflammable vapors (gasoline) while at lower temperatures the mixture tends to thicken and the aluminum chlorid to separate. And I prefer to operate at atmospheric pressure.

In the ordinary operation of running a still continuously with replenishment of the supply of aluminum chlorid from time to time in the form of a fluid magma pumped in, I ordinarily slacken the fires a little just prior to the introduction of the aluminum chlorid; lessening the heat sufficiently to allow the temperature of the vapors above the oil to drop somewhat while not lowering the temperature of the oil itself perceptibly. As aluminum chlorid enters there begins an evolution of gasoline vapors but by proper control of the firing and of the introduction of aluminum chlorid magma, the progress of the distillation can be made absolutely uniform, the stream of condensate from the gasoline condensers being uninterrupted and not varying in volume.

In the still the aluminum chlorid so introduced blends readily with the oil and it exerts its action thereon. In this type of distillation it is customary to provide the still with some form of agitating means; usually a chain drag or the like. This serves to keep the aluminum chlorid in suspension against its tendency to settle. In its action upon oil, the chlorid gradually loses activity or catalytic power and becomes converted into a mass having a more or less pitchy nature when heated. I have found that this thick material is not as readily stirred up into oil as is fresh or active aluminum chlorid and has a greater tendency to settle; and the difference is sufficiently great to enable a convenient removal of exhausted chlorid from time to time. It is merely necessary, while keeping the chain drags running at the usual rate, to draw off the thick layer on the bottom in order to remove all the exhausted chlorid. In so drawing off the thick material, which may be done by an ordinary type of tar gate, very little oil accompanies it; and most of this oil may be recovered by settling as the residue becomes cold. It is not necessary to interrupt firing or the stirring in order to remove the exhausted material. The exhausted material so removed has practically no activity left in it and it may be advantageously sent to the chlorid recovery plants (see Patent No. 1,202,081).

By feeding in aluminum chlorid as a magma in the manner described and removing exhausted chlorid from time to time, the stills can be kept running continuously without at any time slackening or diminishing the flow of distillate. The oil to be converted is pumped into the still continuously. In so doing the operation becomes very efficient and the yield of gasoline from the oil is very high while the activity of the aluminum chlorid is utilized to the fullest extent. There are no "bottoms" or residues of oil; all the oil going into the still, except for a slight loss, being converted into gasoline. In practice however I ordinarily shut down the stills after a run of about two or three weeks for the purpose of inspecting and repairing the stirring mechanism. The stills, so far as the process is concerned, may be run indefinitely longer; but I find it is good practice to shut down every two weeks or so for inspection. In so closing down however, the contents of the still are simply transferred to another still and distillation continued. By so doing, distillation of the oil body is practically continuous, there being merely the pause necessary to transfer the oil from one still to another. As a matter of convenience, I ordinarily arrange to shut down and transfer at a time just prior to the addition of fresh aluminum chlorid. If a plurality of stills be used and started somewhat out of phase, this will always give me an empty inspected still into which to transfer the hot oil from a still to be shut down for inspection.

In the accompanying illustration I have shown, more or less diagrammatically, an apparatus useful for the performance of my process and within the purview of my invention. In this showing—

Figure 1 is a diagrammatic illustration with parts in plan, other parts in elevation and other parts in vertical section; and Figure 2 is a vertical section through one of the stills and the vapor cooling and condensing apparatus.

In describing the drawing I shall at the same time point out the operation of the apparatus. The oil which is to be converted may either be supplied from a storage tank 1 (which I term the cold oil supply) or from a preliminary warming tank 2 to the mixer 3. Oil may be delivered from the cold supply to the pump 4 through valved pipe 5 provided with a check 6 to the manifold 7 whence it is supplied through valved pipe 8 to the warming tank 2. This tank is provided with interior steam coils 9, steam being admitted at 11 and removed at 10. If the cold oil is to be supplied directly to the mixer, it can be so delivered by the pump 4 through pipe 12, adjustable valves in the manifold being provided for the purpose. The oil after being warmed in tank 2 may be delivered through the valved pipe 13 to the manifold and thence by the pump 4 and pipe 12 to the mixer 3. This mixer is normally closed and has a steam coil 14 on the outside thereof with provision for admitting steam at 15 and removing it at 16. Thermometer 17 is provided for reading the temperature. Anhydrous aluminum chlorid in the proper amounts may be added through the opening 18, provided with the closure 19. It is necessary that the mixture of anhydrous aluminum chlorid and oil be agitated to prevent settlement of the aluminum chlorid, and this is accomplished through means of a stirring apparatus comprising a shaft 20 seated at 21 and journaled through the top of the apparatus at 22. The shaft is provided with beveled gear 23 meshing with the beveled pinion 24 on a shaft 25 passing through journal 26 on a bracket and having at its extremity a gear wheel or pulley 28. The vertical shaft 20 is provided with a pair of horizontal arms 29 between which are spaced a series of chains 30 and the lower arm 29 is provided with a chain attached to present a series of loops 30', thus affording a device which will drag the bottom of the apparatus and prevent settlement and caking of the aluminum chlorid.

By proper manipulation of the valves of the manifold, after the proper proportion of oil and aluminum chlorid have been mixed and when this mixture is at a suitable temperature, it is pumped by means of supply pump 4 through the pipe 31 to any one of the stills as hereinafter described. To insure maintenance of the proper temperature this oil pipe 31 is paralleled by steam pipe 32, the steam being admitted at 33 and exhausted at 34; and the two pipes are advantageously wrapped with an insulation of asbestos 35 or other heat retaining material.

As has been stated, I operate a plurality of stills at the same time, such stills being arranged in parallel and each connected to the oil and aluminum chlorid delivery conduit 31 through means of valved pipes 36 leading to the top of the stills as is shown more clearly in Figure 2. The oil and aluminum chlorid magma is delivered into any one of the stills as occasion requires and the bulk of the oil is supplied from a preliminary heating apparatus K which may be in the form of a still or other suitable device. This still or heating device K is supplied with oil through valved inlet 37, although it may be supplied directly through its pipe 36 corresponding to the same pipes on the other stills. Each still comprises a substantial iron casing 38 bricked in on all sides as at 39 and provided with a covered man-hole 40 for the purpose of cleaning out any sedimentation. The exhausted aluminum chlorid is removed through pipe 41 provided with a plate valve 42 and is advantageously delivered to a car 43 on tracks 44 by means of which it is carried to the charring oven where the residual oil in the sludge is distilled and where the remaining material is carbonized for future use. Each still (which I have lettered in Figure 1 A to J inclusive) is provided with a stirring device comprising a shaft 45 seated at 46 on the bottom of the still and provided with an inclined arm 46' and the horizontal arm 47, loop chains or drags 48 being secured to the horizontal arm for the purpose of preventing settlement of active aluminum chlorid. The shaft 45 passes through a stuffing box 49 at the top of the still and is provided with a gear 50 meshing with the worm 51 on shaft 52 passing through the journal 53 on bracket 54. The shaft 55 is provided with a pulley or gear for driving by means of a belt or chain. The stirrers may advantageously be operated at about fourteen revolutions per minute for a 1000 barrel still. The still is provided with valved pipe 56 for the purpose of maintaining the level or testing the oil from time to time as the case may be to maintain the level the still may be filled slightly higher than the location of pipe 56 and the oil drawn off through 56 so that the oil will be about to that level. The magma of aluminum chlorid and oil heated to the proper temperature, as has been described, is introduced through pipe 36 and the bulk of the oil upon which the aluminum chlorid is to operate may be introduced through valved pipe 57. The still is provided with an air cooling and condensing chamber or back trap 58 for the purpose of retaining the condensates of high boiling vapors. Beyond this condensing chamber the conduit 59 leads to another air cooling and condensing chamber 60. At its base this chamber is provided with an outlet 61 communicating with reflux conduit 62. Above uncondensed vapors are led forward through conduit 63 communicating with another air cooling and condensing chamber 64. This other air cooling and condensing chamber at its base has an outlet 65 leading back to the reflux device. U pipe 66 in this line acts to form an oil trap. Returning to the last named air cooling chamber 64, vapors are led from it through conduit 67 past thermometer 68 into and through condenser 69 cooled in any suitable way, as by immersion in water in tank 70. Inlet 71 serves for water supply and valve outlet 72 for removal. Condensed gasoline is collected from pipe 73.

In using a battery of stills such as shown, I customarily begin operation with some of the stills later than with others so that they may be operated, so to speak, somewhat out of phase; and I usually run each still for about two weeks. At the end of this time, I withdraw the oil into an empty still wherein distillation with aluminum chlorid is resumed. The still so shut down is cleaned, inspected and repaired. For the most part such repairs as are found to be necessary are to the drag or stirring mechanisms. After inspection the still is ready for use again and receives a charge of hot oil from another still to be shut down for inspection. Exhausted aluminum chlorid is removed from and fresh aluminum chlorid added to each still at intervals of about 48 hours. In removing the exhausted aluminum chlorid, the valve 42 is opened by raising rod 42' and the hot sludge or tar of exhausted aluminum chlorid allowed to flow out into car 43. If withdrawal is properly conducted but little oil goes forward with the exhausted aluminum chlorid, and such oil as does go forward separates from and may be drawn off from the mass in the car 43 as it cools. During the removal of the exhausted aluminum chlorid heating and stirring are continued. After the exhausted chlorid is removed I ordinarily slacken the fires a little until the temperature shown by thermometer 68 drops somewhat. If thermometer 68 is normally standing about 350° F. I may for instance slacken the fires so that it temporarily shows about 200° F. At this time I pump a little warm oil from tank 2 through the oil line 31, sending this oil into the still to be charged. I then add the proper amount of aluminum chlorid and oil to mixer 3 and allow the stirrer to operate until the two blend as a thin, readily flowing magma. This magma is then pumped through pipes 12 and 31 into the still to be charged. The rate of pumping is so controlled by the operator that the flow of distillate from pipe 73 does not change materially during the operation. As soon as the aluminum chlorid is in the still, firing is resumed. The charge in the still is now ready for another 48 hours' operation. Aluminum chlorid may of course be supplied continuously and exhausted chlorid removed continuously but there is little advantage in this. I find that a good proportion of aluminum chlorid for converting heavy oils like solar oil is about 3,000 pounds of the chlorid to 1,000 barrels of oil; or about 1 per cent. After the magma of aluminum chlorid and oil has been pumped through line 31 to the proper still, it is followed by some warm oil from tank 2 to displace the aluminum chlorid magma in the pipe 31 and clean it out.

The supply of the oil to the stills may be normally through this same pipe 31 which serves to supply aluminum chlorid magma; or any desired fraction of the supply may be through this pipe. But it is ordinarily more convenient to have special oil supply means on the still, such as pipe 57.

What I claim is:—

1. In a continuous process of manufacturing gasoline by distilling higher-boiling petroleum oils in a still in the presence of aluminum chlorid, the process which comprises establishing and maintaining a replenished body of agitated boiling oil in such a still, adding aluminum chlorid thereto from time to time and prior to each such addition tapping off the bottom layer of exhausted chlorid without interruption of the agitation.

2. In a continuous process of manufacturing gasoline by distilling higher-boiling petroleum oils in a still in the presence of aluminum chlorid, the process which comprises establishing and maintaining a replenished body of agitated boiling oil in such a still, and adding aluminum chlorid from time to time in the form of a magma of oil and chlorid without interruption of the agitation.

3. In the operation of stills producing gasoline from higher boiling petroleum oils with the aid of aluminum chlorid, the process of replenishing the supply of aluminum chlorid therein without interruption of operation which comprises making a magma of aluminum chlorid and high boiling oil and adding such magma to the body of hot oil.

4. In the operation of stills producing gasoline from higher boiling petroleum oils with the aid of aluminum chlorid, the process of replenishing the supply of aluminum chlorid therein without interruption of operation which comprises making a magma of aluminum chlorid and high boiling oil at a temperature around 150° F. and adding such magma to the body of hot oil.

5. In the production of gasoline by distilling high boiling oils with aluminum chlorid in a suitable still, the process which comprises operating such still continuously with a continuous supply of oil to and withdrawal of vapors from such still, aluminum chlorid being added to the still at intervals in the form of a magma of aluminum chlorid and oil, and exhausted aluminum chlorid being withdrawn from the stills at intervals by tapping off a suitable amount of the contents of the still at the bottom.

6. In the operation of stills producing gasoline by the action of aluminum chlorid on heavy oils, the process which comprises blending solid aluminum chlorid with oil at a temperature around 150° F. to make a fluid magma and pumping said fluid magma into the still whenever replenishment of the aluminum chlorid charge therein becomes necessary.

7. In the manufacture of gasoline from heavy oils by distillation with aluminum chlorid, the process which comprises maintaining a suitable still charged with a continuously replenished body of boiling oil admixed with active aluminum chlorid and agitated by mechanical means and from time to time tapping off the settled matter from the bottom of the still without interrupting the agitation or heating.

8. In an apparatus for the production of gasoline with the aid of aluminum chlorid, a battery of stills, a heating and mixing device, means for adding aluminum chlorid to the mixer, means for adding oil to the mixer and a heated conduit establishing communication between said mixer and any still of the series.

9. In a plant for the production of gasoline from heavy oils with the aid of aluminum chlorid, a battery of stills, each provided with an oil inlet, partial reflux and condensing means, condensing means beyond the partial reflux, a tar gate, stirring means and a pipe connection for the introduction of a magma of aluminum chlorid and oil, means for blending aluminum chlorid with warm oil, and pumping means for transmitting the aluminum chlorid magma so produced to any of the stills and a pipe line from the pumping means supplying said pipe connections.

In testimony whereof, I affix my signature hereto.

ALMER McD. McAFEE.